(12) United States Patent
Schilling et al.

(10) Patent No.: US 7,289,781 B2
(45) Date of Patent: Oct. 30, 2007

(54) DEVICE FOR RECEIVING DIGITAL SIGNALS

(75) Inventors: Harry Schilling, Eichstätt (DE); Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 416 days.

(21) Appl. No.: 10/654,267

(22) Filed: Sep. 3, 2003

(65) Prior Publication Data
US 2004/0116099 A1   Jun. 17, 2004

(30) Foreign Application Priority Data
Sep. 5, 2002   (DE) ................. 102 41 554

(51) Int. Cl.
*H04B 17/00* (2006.01)
(52) U.S. Cl. .............. 455/226.1; 455/234; 455/67.1; 455/41.1; 455/13.4; 375/245; 375/345
(58) Field of Classification Search ............... 455/234, 455/67.11, 41.1, 226.1, 13.4; 375/245, 345
See application file for complete search history.

(56) References Cited

U.S. PATENT DOCUMENTS

| | | | | | |
|---|---|---|---|---|---|
| 4,245,350 | A | * | 1/1981 | Moore | 455/180.2 |
| 4,507,791 | A | * | 3/1985 | Gundry | 375/244 |
| 5,206,601 | A | * | 4/1993 | Ready | 329/317 |
| 5,377,232 | A | * | 12/1994 | Davidov et al. | 375/354 |
| 5,450,622 | A | * | 9/1995 | Vandegraaf | 455/222 |
| 6,480,555 | B1 | * | 11/2002 | Renard et al. | 375/340 |
| 6,504,863 | B1 | * | 1/2003 | Hellmark | 375/219 |
| 6,529,850 | B2 | * | 3/2003 | Wilborn et al. | 702/142 |
| 6,898,235 | B1 | * | 5/2005 | Carlin et al. | 375/219 |
| 6,993,291 | B2 | * | 1/2006 | Parssinen et al. | 455/67.11 |
| 7,139,684 | B2 | * | 11/2006 | Pupalaikis et al. | 702/189 |
| 2003/0100282 | A1 | * | 5/2003 | Kandala | 455/234.1 |
| 2005/0143034 | A1 | * | 6/2005 | Khorram | 455/234.1 |

* cited by examiner

*Primary Examiner*—Nay Maung
*Assistant Examiner*—Richard Chan
(74) *Attorney, Agent, or Firm*—Kevin L. Daffer; Daffer McDaniel, LLP

(57) ABSTRACT

A device for receiving digital signals comprising at least one receiving antenna for receiving signals, a measuring means for determining parameters of relevance to signal quality of signals received by the antenna, and a digitizer for the signals received by the antenna. The digitizer is controlled to optimize reception of the signals on the basis of the parameters determined by the measuring means.

11 Claims, 2 Drawing Sheets

DEVICE FOR RECEIVING DIGITAL SIGNALS

FIELD OF THE INVENTION

The present invention relates to a device for receiving digital signals between a plurality of units relative to each other.

For the sake of clarity, in the present document, the transmission between units mobile relative to each other, on the one hand, is not distinguished from the transmission between a stationary unit and units mobile relative to the first unit, on the other hand, because this is only a question of local relationship and does not take any influence on the mode of operation of the invention. Equally, a distinction is not made between the transmission of signals and energy because the mechanisms of operation are the same in this respect.

PRIOR ART

In units mobile along a linear path, such as crane and conveyor installations, and also rotary units such as radar systems and also computer tomographs, it is necessary to transmit electrical signals or energy, respectively, between units mobile relative to each other. To this end, mostly a conductor array is provided in the first unit and corresponding tapping means are provided in the second unit. The term "conductor arrays" as used in the description given below refers to any forms whatsoever of conductor arrays conceivable, which are suitable for conducting electrical signals. This refers also to the known contacting sliding paths or slip rings, respectively.

A suitable device is described in the laid-open German Patent Application DE 44 12 958 A1. There, the signal to be transmitted is supplied into a strip conductor of the first unit that is arranged along the path of the movement of the units mobile relative to each other. The signal is tapped from the second unit by means of capacitive or inductive coupling. The coupling factor of the signal between the two units is substantially a function of the distance of the two units relative to each other. Particularly in transmission systems with three-dimensional extension and particularly in the event of high speeds of movement, the distances between the mobile units cannot be determined with an optional precision, in view of the mechanical tolerances. As a result, as the position of the two units relative to each other, the speed (e.g. caused by vibrations) and other influential parameters vary, the coupling factor frequently varies, too. At the same time, the signal amplitude at the receiver input varies as well. This results in variations in the signal in receivers presenting the conventional structure, which are noticeable, for instance, in the form of an increased jittering or even bit errors.

The U.S. Pat. No. 6,433,631 B2 discloses a device for feedback control of the input level at the receiver. As a result, the problem of the varying levels, which is caused by the variation of the distances, is largely solved. As a matter of fact, however, this device entails all the disadvantages of the known feedback control systems. For example, the setting or optimization of the control parameters is critical and time-consuming. The regulator may develop an inclination to oscillate, with signal transmission being no longer ensured in the case of oscillations in control. Moreover, a high-speed response to variations of the amplitude of the input signal is not possible.

BRIEF DESCRIPTION OF THE INVENTION

The present invention is based on the problem of designing a device for the transmission of electrical signals, which avoids the aforedescribed disadvantages and displays, in particular, a high level of dynamic in the receiver at a high response rate.

In accordance with the present invention, the problem is solved with the means defined in the independent Patent Claims. Expedient improvements of the invention are the subject matters of the dependent further Claims.

An inventive device for the transmission of digital signals comprises a receiving antenna (1) for receiving signals in the near field of a transmitter conductor array. Such a transmitter conductor array may be a conventional slip ring, for instance, or a line for the transmission of high-frequency signals, which is terminated in a reflection-free manner. What is essential is the aspect that this transmitter conductor array is suitable for conducting electrical signals and that reception of signals is possible in the near field of this transmitter conductor array. Accordingly, a receiving antenna (1) is mounted in the vicinity of the transmitter conductor array for receiving the signals in the near field of the latter. A direct galvanic contact between the receiving antenna (1) and the transmitter conductor array remains equally without influence on the realization of the invention. Such a configuration of the contact is encompassed by the subject matter of the invention as well, without mentioning this fact explicitly in the following. A galvanic contact can be created not only by metal contacts but also by means of carbon brushes sliding on sliding paths. Moreover, a measuring means (7) is provided for determining at least one parameter relevant for the signal quality. Such parameters are, for instance, the signal amplitude, the noise, the bit error ratio or the spectral composition of the signal. When, for example, the signal is also dependent on the relative position between the transmitter and the receiver of the data transmission path this position is a signal-relevant parameter, too, and is hence optionally considered in the detection, as well. For the detection of these additional parameters, optional further sensors such as angle detectors, position detectors, temperature sensors as well as sensors detecting further environmental parameters are encompassed, which take an influence on the signal. Finally, an additional digitizer (3) is provided for converting the received signal into digital signals (6). The signal received from the receiving antenna (1) presents analog characteristics as it may be superimposed by varying amplitudes, distorted characteristics and interference as well as noise. For instance, a digitizer may be configured as comparator or even as an amplifier with limiting properties (limiting amplifier). Such a digitizer is occasionally also referred to as demodulator. What is essential for the invention is the fact that this digitizer converts the analog input signal with a varying amplitude into a digital output signal with predetermined level magnitudes.

In accordance with the invention, the measuring means (7) is moreover connected to the digitizer (3) in such a way that the detected parameters are communicated to the latter and that the digitizer is furthermore so configured that it performs the digitization of the analog input signals in correspondence with the communicated parameters. The digitizer can hence respond to varying input amplitudes, varying noise levels, varying bit error ratios or other variations in the characteristics of the input signal and perform the digitization process in correspondence therewith.

This inventive solution permits a direct penetration of the measured parameters to the digitizer without the interposition of a feedback control loop, which is known from prior art.

The control system may be implemented optionally via mathematical functions or even tables of values. Moreover, optional control means may be provided in such a form that strong variations of the zero point of the signal are reduced or completely suppressed.

In a particularly expedient embodiment of the invention, the digitizer (3) is so designed that the switching threshold can be set in correspondence with the parameters signaled by the measuring means (7). In this manner it is possible, for example, to raise the switching threshold for digitization in a corresponding form in the case of a high signal amplitude or strong interference in order to ensure a reliable switching operation and to improve the interference stability. It is likewise possible to respond to a reduction of the signal amplitude or the interference, respectively, by lowering the switching threshold.

In another expedient embodiment of the invention, the digitizer (3) is so configured that the hysteresis can be set in correspondence with the parameters signaled by the measuring means (7). As a consequence it is possible, for instance, to achieve a corresponding increase of the hysteresis in digitization in the event of a high signal amplitude or a strong interference, in order to ensure a reliable switching operation and to improve the interference stability. It is likewise possible to respond to a reduction of the signal amplitude or the interference, respectively, by lowering the switching threshold.

According to a further embodiment of the invention, the digitizer (3) is so configured that the gain can be set in correspondence with the parameters signaled by the measuring means (7). With this provision, too, it is possible to respond to varied conditions of the input signal.

Another embodiment of the invention provides for a configuration of the measuring means (7) for measuring and signaling the amplitude of the HF input signal (4). With the signal amplitude being a particularly important parameter of the input signal, this amplitude is expediently considered for control of the digitization process.

In another embodiment of the invention, the measuring means (7) is designed for measuring and signaling the noise power of the HF input signal (4).

According to a further embodiment of the invention, the measuring means (7) is configured for measuring and signaling the signal-to-noise ratio of the HF input signal (4).

In another expedient embodiment of the invention, the measuring means (7) is designed for measuring and signaling the spectral composition of the HF input signal (4).

Another subject matter of the invention consists in the aspect that an amplifier (2) with a controllable gain is interposed between the receiving antenna (1) and the digitized (3). Moreover, at least one parameter relevant for the signal quality is signaled to this amplifier by the measuring means (7). The amplifier is so configured that its gain can be set in response to the signaled parameters. The amplifier can hence respond to varied characteristics of the signal and carry out the corresponding adaptation of the signal that is made available to the digitizer.

In another embodiment of the invention, the measuring means (7) is configured for signaling the amplitude of the HF input signal (4). The amplifier (2) is furthermore so designed that its gain is inversely proportional to the signal of the measuring means (7). When the input signal is increased it is hence possible to perform a corresponding control operation so as to reduce the amplitude of the amplified signal supplied to the digitizer. When the input signal is reduced it is likewise possible to increase the signal supplied to the digitizer in such a manner that this signal remains largely constant in both cases. Compared against prior art, such an inventive design entails the advantage that here a direct intervention is possible without an additional feedback control loop.

In correspondence with a further expedient configuration of the invention, the measuring means (7) is designed for measuring and signaling the spectral composition of the HF input signal (4). It is hence possible to adapt the gain in correspondence with the spectral composition of the input signal.

DESCRIPTION OF THE DRAWINGS

In the following, the present invention will be described by exemplary embodiments, without any limitation of the general inventive idea, with reference to the drawings.

FIG. 1 illustrates an example of an inventive device. A receiving antenna (1) in a generalized form is provided for tapping electrical or electromagnetic signals from the near field of a transmitting conductor array. The HF input signal (4) received by this receiving antenna (1) is supplied to a measuring means (7) for the detection of signal-relevant parameters as well as to a digitizer (3) for conversion of the analog signals into digital signals. The measuring means detects defined parameters descriptive of the HF input signal such as optionally the signal amplitude, the noise power, the noise level, the signal-to-noise ratio, the eye opening in terms of height or width, respectively, as well as optionally a summary parameter composed of several ones of these parameters. The parameter so determined is supplied to the digitizer as control signal for the hysteresis. The HF input signal is then digitized in correspondence with this control signal and converted into a digital output signal (6).

FIG. 2 shows another inventive device in a generalized form. The HF input signal (4) tapped by a receiving antenna (1) is supplied to a measuring means (7) for determining parameters relevant for the signal as well as to an amplifier (2) for amplification. The output signal (5) of the amplifier is, in its turn, supplied to a digitizer (3) for conversion of the analog signals into digital signals. The measuring means detects defined parameters relevant for the signal, as has been described above, and signals them as control signal (10) to the amplifier for amplification. The amplifier sets its amplitude in correspondence therewith so that a signal (5) with largely constant characteristics is transmitted to the digitizer. FIG. 3 finally represents also a device corresponding to prior art. Here, the HF input signal (4) received by the receiving antenna (1) is supplied to a controllable amplifier (2). The output signal (5) of the amplifier is supplied to a measuring means (7) for measuring the signal amplitude and to a digitizer (3) for conversion into digital signals. Moreover, a feedback control loop is provided in such a way that the signal from the measuring means (7) is supplied as feedback control signal (8) to the amplifier (2) for controlling the latter.

Figure 1:
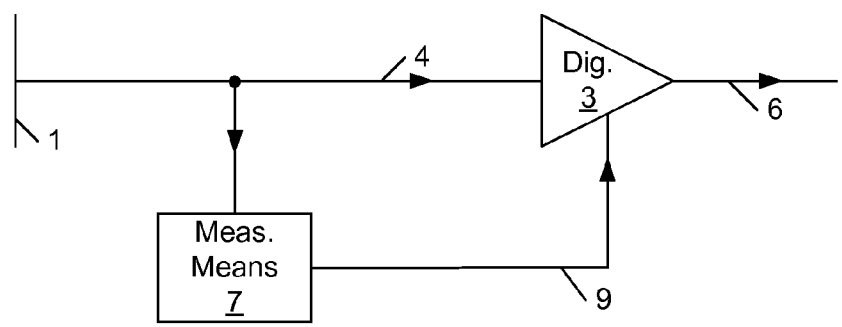
FIG. 1 shows a schematic illustration of an inventive device in a general form.
Figure 2:
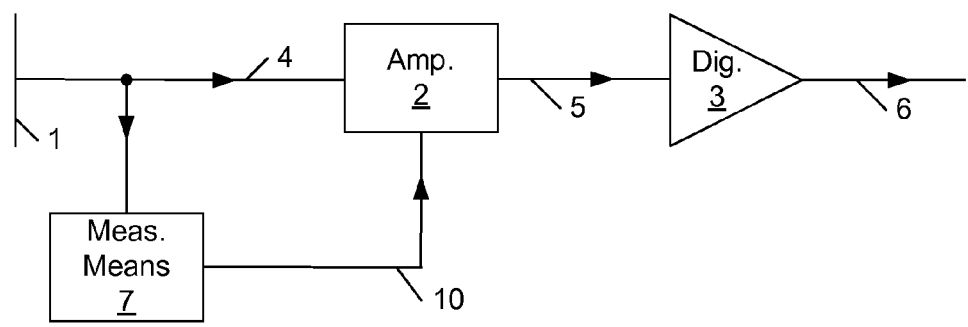
FIG. 2 illustrates an inventive device comprising a controllable amplifier.
Figure 3:
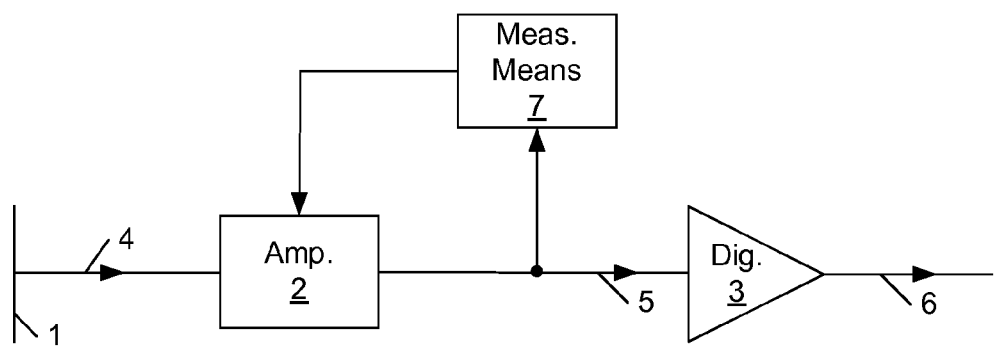
FIG. 3 represents the known prior art.

LIST OF REFERENCE NUMERALS 1 receiving antenna
2 amplifier
3 digitizer
4 HF input signal
5 amplitude-controlled signal
6 digital output signal 7 measuring means
8 feedback control
9 hysteresis control signal
10 gain control signal

The invention claimed is:

1. A device for receiving digital signals, comprising:
a receiving antenna for receiving signals in the near field of a transmitter conductor array;
a measuring means for determining at least one parameter of relevance to signal quality of the signals received by said receiving antenna;
a digitizer for converting the signals into digital signals;
wherein said measuring means is connected directly to, and only to, an output of the receiving antenna and to a control input of the digitizer to communicate to said digitizer the determined at least one parameter of relevance to said signal quality; and
wherein said digitizer is coupled to receive non-amplified output of the receiving antenna directly on a receiving input of the digitizer to digitize the signals received by said receiving antenna in accordance with said at least one parameter communicated by said measuring means.

2. The device of claim 1, wherein said digitizer has a switching threshold which is adjustable in accordance with said at least one parameter communicated by said measuring means.

3. The device of claim 1, wherein a hysteresis of said digitizer is adjustable in correspondence with said at least one parameter communicated by said measuring means.

4. The device of claim 1, wherein a gain of said digitizer is adjustable in accordance with said at least one parameter communicated by said measuring means.

5. The device of claim 1, wherein said measuring means is designed to measure an amplitude of an HF input signal and to communicate said measured amplitude to said digitizer.

6. The device of claim 1, wherein said measuring means is designed to measure a noise power of said HF input signal and to communicate said measured noise power to said digitizer.

7. The device of claim 1, wherein said measuring means is designed to measure a signal-to-noise ratio of an HF input signal and to communicate said measured signal-to-noise ratio to said digitizer.

8. The device of claim 1, wherein said measuring means is designed to measuring a spectral composition of an HF input signal and to communicate said measured spectral composition to said digitizer.

9. A device for receiving digital signals, comprising:
a receiving antenna for receiving signals in a near field of a transmitter conductor array;
a measuring means connected only to an output of the receiving antenna for determining at least one parameter of relevance to signal quality of the signals received by said antenna;
a digitizer for digitizing the signals received by the receiving antenna;
wherein a controllable gain amplifier is provided between said receiving antenna and said digitizer to amplify the signals received by said antenna;
wherein said measuring means is connected to communicate the determined at least one parameter of relevance to signal quality output from the measuring means directly to a gain control input of said amplifier; and
wherein said amplifier is designed to amplify the signals in correspondence with said at least one parameter communicated by said measuring means.

10. The device of claim 9, wherein said measuring means is designed to communicate the amplitude of an HF input signal to said amplifier; and
wherein said amplifier has a gain which is inversely proportional to the amplitude communicated by said measuring means.

11. The device of claim 9, wherein said measuring means is designed to measure and communicate the spectral composition of an HF input signal to said amplifier.

* * * * *